(12) United States Patent
Bhumkar et al.

(10) Patent No.: US 9,740,794 B2
(45) Date of Patent: Aug. 22, 2017

(54) METHODS AND SYSTEMS FOR ENHANCING INTERNET EXPERIENCES

(75) Inventors: Soujanya Bhumkar, Palo Alto, CA (US); Mayank Mehta, Quebec (CA); Austin Shoemaker, Palo Alto, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 2940 days.

(21) Appl. No.: 11/613,838

(22) Filed: Dec. 20, 2006

(65) Prior Publication Data
US 2008/0235594 A1 Sep. 25, 2008

Related U.S. Application Data

(60) Provisional application No. 60/753,783, filed on Dec. 23, 2005.

(51) Int. Cl.
*G06F 3/048* (2013.01)
*G06F 17/30* (2006.01)

(52) U.S. Cl.
CPC .. *G06F 17/30899* (2013.01); *G06F 17/30991* (2013.01)

(58) Field of Classification Search
CPC .................................................. G06F 17/30991
USPC ............ 715/738, 700; 707/E17.121, E17.12, 707/E17.119
See application file for complete search history.

(56) References Cited

U.S. PATENT DOCUMENTS

| | | | |
|---|---|---|---|
| 5,825,348 A | 10/1998 | Ludolph et al. | |
| 6,005,579 A | 12/1999 | Sugiyama et al. | |
| 6,243,091 B1 | 6/2001 | Berstis | |
| 6,356,908 B1 | 3/2002 | Brown et al. | |
| 6,544,295 B1 | 4/2003 | Bodnar | |
| 6,864,904 B1 | 3/2005 | Ran et al. | |
| 7,010,755 B2 | 3/2006 | Anderson et al. | |
| 7,047,502 B2 | 5/2006 | Petropoulos et al. | |
| 7,111,240 B2 | 9/2006 | Crow et al. | |
| 7,292,243 B1 * | 11/2007 | Burke ........................... | 345/440 |
| 7,596,760 B2 | 9/2009 | Sauve et al. | |
| 2002/0013836 A1 * | 1/2002 | Friedman et al. ............ | 709/223 |
| 2002/0057287 A1 * | 5/2002 | Crow et al. .................... | 345/716 |
| 2002/0138847 A1 * | 9/2002 | Abrams et al. ............... | 725/105 |
| 2002/0143558 A1 * | 10/2002 | Joseph ............................. | 705/1 |
| 2002/0163545 A1 | 11/2002 | Hii | |
| 2003/0014415 A1 * | 1/2003 | Weiss et al. .................... | 707/10 |

(Continued)

OTHER PUBLICATIONS

Geisler, Gary, "Enriched Links: A Framework for Improving Web Navigation Using Pop-Up Views", Interaction Design Laboratory, 14 pages, University of North Carolina at Chapel Hill, Chapel Hill, NC.

(Continued)

*Primary Examiner* — Matthew Ell
*Assistant Examiner* — Mohamed Abou El Seoud
(74) *Attorney, Agent, or Firm* — James J. DeCarlo; Greenberg Traurig, LLP (57) ABSTRACT

Previews of a target web site or other Internet-accessible resource are displayed in response to cursor control events. The previews are displayed in preview windows, which may have associated toolbars that include functions permitting various manipulations of the content displayed in the preview window. In some cases, the target web site is displayed as an image thereof in the preview window.

7 Claims, 6 Drawing Sheets

(56) References Cited

U.S. PATENT DOCUMENTS

| | | | |
|---|---|---|---|
| 2004/0003351 A1 | 1/2004 | Sommerer et al. | |
| 2004/0205514 A1 | 10/2004 | Sommerer et al. | |
| 2004/0205633 A1* | 10/2004 | Martinez et al. | 715/526 |
| 2004/0250219 A1 | 12/2004 | Sawada | |
| 2005/0216856 A1* | 9/2005 | Matti | 715/768 |
| 2006/0069617 A1 | 3/2006 | Milener et al. | |
| 2006/0069618 A1* | 3/2006 | Milener et al. | 705/14 |
| 2006/0070012 A1 | 3/2006 | Milener et al. | |
| 2006/0074984 A1 | 4/2006 | Milener et al. | |
| 2006/0101341 A1 | 5/2006 | Kelly et al. | |
| 2006/0101514 A1 | 5/2006 | Milener et al. | |
| 2006/0107234 A1* | 5/2006 | Tudor et al. | 715/821 |
| 2006/0143568 A1 | 6/2006 | Milener et al. | |
| 2006/0277167 A1* | 12/2006 | Gross et al. | 707/3 |
| 2007/0027957 A1* | 2/2007 | Peters et al. | 709/217 |
| 2007/0073833 A1* | 3/2007 | Roy et al. | 709/217 |
| 2007/0074125 A1* | 3/2007 | Platt et al. | 715/760 |
| 2009/0132373 A1* | 5/2009 | Redlich | 705/14 |

OTHER PUBLICATIONS

Marchionini, Gary; et al., "Agileviews: A Human-Centered Framework for Interfaces to Information Spaces", 13 pages, University of North Carolina at Chapel Hill.

Arrington, M., "Cooliris Copies Browster," Tech Crunch, Apr. 11, 2006, 6 pages, [online] [retrieved on Aug. 13, 2010] Retrieved from the internet <URL: http://techcrunch.com/2006/04/11/cooliris-copies-browster/>.

Berline, G., "Browster 2.0," PC Magazine, Aug. 13, 2006, 1 page. [online] [retrieved on Aug. 6, 2010] Retrieved from the internet <URL: http://www.pcmag.com/article2/0,2817,2002624,00.asp>.

Gibbs, M., "Software and Services: Browser 1.0," Network World, Jul. 4, 2005, 3 pages, [online] [retrieved on Aug. 6, 2010] Retrieved from the internet <URL: http://www.pcworld.idg.com.au/review/software_and_services/browster/1_0/218754>.

Iskold, A., "Browster Is Gone, But Are Web Previews Here to Stay?," ReadWriteWeb, Jan. 8, 2007, 7 pages, [online] [retrieved on Aug. 6, 2010] Retrieved from the internet <URL: http://www.readwriteweb.com/archives/web_previews_overview.php>.

Kopetzky, T., et al., "Visual preview for link traversal on the World Wide Web," Proceedings of the 8th International World Wide Web Conference, May 11-14, 1999, Toronto, CA, pp. 447-454.

Malik, O., "Browser 2.0 to Launch?," GigaOM, Aug. 13, 2006, 1 page [online] [retrieved on Aug. 6, 2010] Retrieved from the internet <URL: http://gigaom.com/2006/08/13/browser-20-to-launch/>.

Archive of Milener, S., "The Browster Blog: Next-Gen Navigation—Personal Viewing on the Web," Apr. 6, 2006, 5 pages, [archived on web.archive.com on Apr. 13, 2006] [online] [retrieved on Aug. 13, 2010] Retrieved from the internet <URL: http://web.archive.org/web/20060413111411/browster.typepad.com/scott_milener_blog/2006/04/nextgen_navigat.html>.

Office Action for U.S. Appl. No. 11/751,585, Mar. 16, 2010, 14 pages.

* cited by examiner

METHODS AND SYSTEMS FOR ENHANCING INTERNET EXPERIENCES

RELATED APPLICATIONS

This application is a nonprovisional of, claims priority to and incorporates by reference U.S. provisional patent application 60/753,783, filed 23 Dec. 2005.

FIELD OF THE INVENTION

The present invention relates to the display and/or consumption of information, such as over the Internet. More particularly, the present invention relates to methods and systems for navigating, displaying, extracting, sharing and/or storing links, text and/or media using gesture-based or similar interfaces to the Internet.

BACKGROUND

The use of search engines (e.g., Google™, Ask Jeeves™, Yahoo™, etc.) has become ubiquitous for today's Internet users. Such search engines provide convenient means for locating resources of interest among the ever growing number of Internet-accessible Web sites. However, because of the vast number of such sites catalogued or otherwise made accessible by these search engines, users are often confronted with large numbers of results in response to search queries. Often, many of these search results are not relevant to the original queries.

Moreover, the Internet is growing rapidly in terms of the amount of hosted information available to users, yet the access/interface to such information remains somewhat restrictive. For example, RSS feeds provide pages with densely packed links and users are expected to click through to or open a new tab or window for each feed of interest. This need to click through or open new tabs (or maximize new windows or windows that cover the parent/original page without giving the user a choice to do otherwise) causes the user to lose the context of his/her original search. Compounding this problem, to get back to the original workspace the user is sometimes forced to reload the original page.

Figure 1:
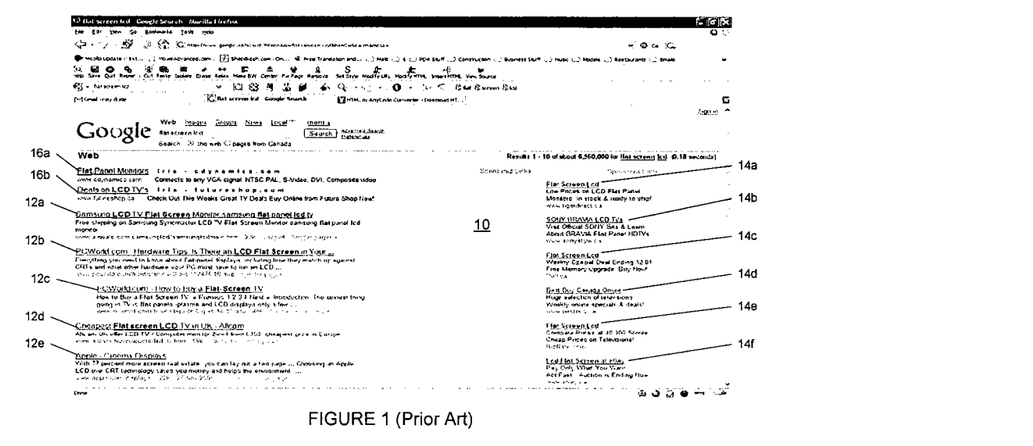
FIG. 1 illustrates a conventional search result Web page returned in response to a search query.

An example of the above-described inefficiencies in browsing is illustrated in FIG. 1. Shown is a list of search results (i.e., displayed in a browser running on a user's computer) that has been returned in response to a search query. Not all of the search results returned in response to the user's search query are necessarily relevant to that query. However, it is often difficult for the searcher to differentiate between relevant and irrelevant results because of the limited information returned by the search engine in a results page 10. For example, such results pages often provide only a list of hyperlinks to the target web pages associated therewith. In some cases, a few lines of text clipped from the target web page will be presented along with the associated hyperlink, however, this text is usually limited to a few words which may or may not help the searcher in assessing the relevancy of the returned result.

In the example shown in FIG. 1, search results page 10 was returned in response to a search query directed to "flat screen lcd" (in the examples presented herein a Google search result page is used, however, the present invention is applicable to any search results page returned from any search engine and, indeed, to any web page whether or not it is a search results page). Links 12a-12e to target web sites are displayed along the left side of the page while links 14a-14f to commercial sites are displayed along the right side of the page. The modest amount of text displayed in conjunction with each of the result links provides the searcher with little or no information on which to base a decision as to the relevance of the associated web page/site vis-à-vis the searcher's search. To fully determine whether or not the result is truly relevant the searcher must actually click through to the target web page associated with the link.

The so-called "sponsored links" (14a-14f and 16a-16b) displayed on the top and right side of the search results page 10 are usually associated with commercial entities that pay for the privilege of having their links appear in these prominent locations on the search results page. The links are said to be "sponsored" because the advertiser pays the search engine provider to insure that the link to the target web site appears in the designated location. Payment for this "sponsorship" may be based on either or both of a "cost per million" (CPM) or "cost per click" (CPC) model. In the CPM model, advertisers pay based on the number of "impressions" or number of times their sponsored link is presented in conjunction with a search result page. In the CPC model, advertisers pay for actual click-throughs to the target web site associated with the sponsored list.

Both the CPC and CPM models are inefficient. From the search engine provider's point of view the CPC model is inefficient because valuable search result page real estate must be devoted to sponsored links even if the user does not click through to the target web pages and the provider is not compensated for the display of the sponsored link. From the advertiser's point of view the CPM model is inefficient because advertisers must pay for display of their sponsored links even if those links fail to generate any actual user traffic to the target web sites. From the searcher's standpoint both models are inefficient because the information presented is so minimal as to make it virtually impossible to know whether or not the linked site is truly relevant.

Further, the present interfaces to the Internet make extracting information somewhat restrictive and often involve multiple steps. For example, saving an image from a Web page accessed via the Internet requires a user to right-click a mouse (or similar cursor control device) and specify a file name and storage location for a local copy of the image to be saved. In obtaining any necessary information the user often must employ many mouse clicks and cursor scrolls. For example, visiting multiple search results and sub-results (links within the results) before finding the desired information. Often the user is presented with too much information as well. For example, image results returned by conventional search engines or sites present the entire original Web page containing the image, instead of just the image and some information along with it.

In addition, the "point of information share", such as email or instant messaging is very disconnected from "the point of navigation and consumption". For example, sharing a link with oneself or others requires a user to copy and paste the link into a new message window in the user's email client. There is also no easy, intuitive method of sharing multiple files, links, text, images or videos.

Furthermore, the "point of access to references", such as a search engine interface or other Web site, is also very disconnected from "the point of navigation". For example, looking up a definition for a word or phrase requires a user to open a new window or tab to conduct a search, needlessly taking the user away from the context of his/her navigation.

Geisler described a conceptual framework for enriching Web links by displaying small, information-rich visualizations—pop-up views—that provide a user with information about linked pages that can be used to evaluate the appropriateness of the pages before making a commitment to select the link and wait for the page to load. See, e.g., Gary Geisler, "Enriched Links: A Framework For Improving Web Navigation Using Pop-Up Views" (2000). Three types of pop-up views were described: Preview pop-up views consisted of thumbnail imaged of the linked page; Overview pop-up views provided a more detailed summary of the objects that make up a linked page; and History pop-up views used Web access log data to give the user an indication of how the linked page has been accessed by other users. Importantly, the enriched links with pop-up views as described by Geisler required that two significant operations occur on the host Web server. First, the to data displayed on the pop-up views had to be pre-generated and saved, and second the Web server configuration was required to be modified to append this data to the requested Web page at the time of the request.

Brunk et al. generalized the discussion of previews and the like in describing so-called "agileviews", which provide a framework for interfaces that permit flexible control over different views for an information space. See, e.g., Gary Marchionini, Gary Geisler & Ben Brunk, "Agileviews: A Human-Centered Framework for Interfaces to Information Spaces". Technical Report TR 2000-01, University of North Carolina (January 2000).

SUMMARY OF THE INVENTION

In one embodiment of the present invention, while a first Web page that includes a link to a second Web page is loading in a browser, an anchor associated with the link to the second Web page is identified and a cursor control event handler is attached to the anchor. The first Web page is displayed in the browser and, upon detecting a cursor control event associated with the cursor control event handler, instructions defined by the cursor control event handler are executed to display an image of content from the second Web page in a window superimposed over or adjacent to the first Web page as displayed in the browser. Prior to, or concurrently with, displaying the image of content from the second Web page, the content from the second Web page is fetched. This fetching may be done prior to detecting the cursor control event, or upon detecting the cursor control event.

The cursor control event may involve more than one cursor action. For example, upon detecting a first cursor action instructions defined by the cursor control event handler may be executed to display an icon in proximity to the link to the second Web page on the first Web page. Then, upon detecting a second cursor action, the image of the second Web page may be displayed in the window. This second cursor action may, for example, be a mouseover of the icon displayed in proximity to the link to the second Web page.

In some cases the cursor control event handler may be a script that causes a hidden frame to be rendered in the first Web page. The hidden frame may be created through an application programming interface associated with a <canvas>, <iframe>, or other DOM element, where such an element is supported by the browser, but this is not critical to the present invention. Within the hidden frame, the browser may make a request for the content of second Web page, which subsequently loads in the hidden frame. The content of the second Web page loaded in the hidden frame may then be converted to the image thereof.

In some embodiments of the invention, an interactive browsing view, instead of an image representation, may be used to display the second Web page. In some cases, the user may interact directly with the second Web page, for example by selecting links displayed in the second Web page (e.g., thereby navigating to other pages) or performing other actions with or within the second Web page.

In some cases, the content of the second Web page, or the presentation thereof, may be altered from its original form. For example, when previewing a news article from a news Web site, an associated table of contents may be removed to optimize the use of the limited display window. More generally, some embodiments of the invention may provide for highlighting, summarizing, compressing, or otherwise bringing attention to regions of the Web page that are relevant to the user's browsing context. For example, words in the previewed Web page matching a search query term may be highlighted or otherwise accentuated when displayed in the preview window. Additionally or alternatively, regions of the second (or other previewed) Web page deemed most relevant to the context of the user's current browsing session may be extracted and concatenated together to form a compressed representation of the content/regions in the second Web page of most interest to the user.

In some embodiments of the invention, the second Web page may be presented via "progressive disclosure" of content, wherein a subset of the page's content is made initially visible. In response to actions by the user, such as a cursor control event, the displayed region of content may be expanded to reveal more/additional content, or related (e.g., within the context of the browsing session) information. For example, a cursor control event such as selection of a button placed next to a search result description may result in the summary being expanded in place to reveal more of the page content. Alternatively, or in addition, selection of a key word in an article may open a preview window in which is displayed information related to the key word. Further, in response to a mouseover of text or other action, images related to the text may be displayed in a preview window.

Where appropriate, the second Web page may be a previously cached version of the second Web page. Further, the image of the content of the second Web page may be displayed according to one or more visual effects. For example, the image may be displayed so as to be successively scaled as it is revealed. In any event, upon display of the image of content of the second Web page, a fee for such display may become due.

A further embodiment of the invention involves displaying a preview of a second Web page linked to by a first Web page displayed in a browser. The preview is displayed in a preview window associated with the browser and in response to a cursor control event associated with the first Web page. The preview window includes a toolbar providing access to one or more functions for manipulating content shown in the preview window. The toolbar may provide access to one or more functions, such as a first function allowing a user to trace a navigation history within the preview window; a second function to close the preview window; a third function to open a communication interface through which the user can share contextual information concerning the second Web page; a fourth function to maintain display of the preview window; a fifth function to display content of the preview window in a full screen fashion; a sixth function to accumulate previews/information as a stack (e.g., accessible via a toolbar); a seventh function to publish either the URL (or other locator/address) or a thumbnail or the actual page to a server (such as Flickr, Delicious, etc); and an eighth function of converting the preview to a postcard (e.g., as may contain a music element that was attached by the user or from another Web site, and/or which may also contain a "sponsored stamp", providing a vehicle for monetizing the associated images (e.g., via a revenue sharing agreement or other arrangement)).

The preview window may be configured to permit display of an RSS feed associated with the second Web page, a WAP version of the second Web page, and/or of content from other Web pages deemed similar to the second Web page.

In still another embodiment of the invention, in response to a cursor control event associated with selected content of a first Web page displayed in a browser, the selected content is submitted as a reference to a designated or customizable Web site selected from a menu displayed in response to the cursor control event. Results from the designated Web site are presented in a preview window superimposed over the first Web page displayed in the browser. The cursor control event may be a right mouse click and the designated Web site may be a search engine, an on-line dictionary or an on-line encyclopedia.

In yet another embodiment of the invention, information is extracted from Internet content in response to a cursor control operation associated with a cursor control menu option, and content of a preview window is saved to a designated storage site in response thereto.

Embodiments of the invention may incorporate methods for facilitating relevancy feedback and thereby refining the results of a search query. For example, a user may highlight (e.g., via a cursor control action or set of actions) or otherwise indicate interest in information in a particular region of the first or second Web pages (i.e., the Web page displayed in the browser window or the preview window), and that information may be conveyed to the search engine for use in refining the search. This feedback approach allows for adjustment or refinement of the search results in an attempt to better match the user's information need. Additionally or alternatively, the invention may observe and analyze user behavior (e.g. mouse movements, clicks, scrolling, and other user input data) with respect to the browsing interface, and infer interest and/or lack of interest in certain regions of Web page content. Such information may be used to provide modified search results to the user.

A further embodiment of the invention provides a graphical user interface for a computer system. The interface includes a cursor control menu having arranged therein a single command, which when invoked in response to a cursor control operation, will cause the computer system to execute instructions to save designated content of a presently displayed Web page to a designated storage site.

Still another embodiment of the invention provides a graphical user interface for a computer system. This interface includes a cursor control menu having arranged therein one or more commands, which when invoked in response to a cursor control operation, will cause the computer system to execute instructions to submit selected content of a first Web page displayed in a browser of the computer system as a reference to a designated Web site, and present results from the designated Web site in a preview window superimposed over the first Web page displayed in the browser.

BRIEF DESCRIPTION OF THE DRAWINGS

The present invention is illustrated by way of example, but not limitation, in the figures of the accompanying drawings, in which.

DETAILED DESCRIPTION

To alleviate problems such as those discussed above as are associated with the manner in which users navigate, extract, share and store information over the Internet, the present invention introduces the concept of a "quick view" or "preview" of a target web site (e.g., as returned in response to a search query) or other Internet-accessible resource. In one embodiment of the present invention, quick views are displayed in response to gestures, such as mouseover events wherein a user positions a cursor over or near a hyperlink. Accordingly, the present invention is not limited to returning quick views associated with search engine result pages, but may instead be used with any hyperlinks or similar anchors associated with any Web page rendered in a browser.

In part, the problem of navigating to relevant links is solved by introducing a quick view of any hyperlink associated with any Web site. The quick view may be initiated and presented in a variety of different ways. As indicated above, in one embodiment of the present invention quick views are displayed in response to mouseover events. In another embodiment of the present invention, previews are displayed in response to two consecutive mouseover events wherein a user positions a cursor over a hyperlink, and then subsequently over an icon associated with that hyperlink (e.g., positioned in proximity to the hyperlink), which icon is displayed as a result of the first mouseover event. In still another embodiment of the present invention previews are displayed in response to a hot-key event coordinated with a mouseover (e.g., pressing a <CTRL> or other key on a keyboard event when mousing over a target link). In yet another embodiment of the present invention previews are displayed in response to selection (e.g., by mouse click) of a target link, wherein a different selection operation (e.g., a double click) causes a browser redirect. A stack ensures that previewed content of interest is preserved as a thumbnail and the user can come back to it later while continuing to browse the "parent page".

The preview window displayed in accordance with the present invention may offer or permit any conventional browser functionality, such as Back, Jump to, Close, Share, Lock, RSS, WAP, Sidekick, Stumble, Full Screen, etc., in order to further facilitate solutions to the aforementioned problems. Back allows users to trace their click history within a current preview session. Close simply closes the preview window. Share initiates a communication interface (e.g., a message box) through which users can share contextual information with themselves or others (e.g., by providing one or more email addresses). Lock ensures that the preview window does not close accidentally (Lock may operate as a toggle and so have On/Off modes). RSS recognizes whether or not the current preview page has RSS feeds and, upon a further cursor control operation (e.g., a mouse click), displays such feeds either in a drawer that slides out from the preview window or by replacing the current content of the preview window. WAP recognizes whether or not the current page has a WAP version of the page and, upon a further cursor control operation (e.g., a mouse click), displays the WAP page either in a drawer that slides out from the preview window or by replacing the current contents of the preview window. Sidekick slides out a drawer of content from a side of the preview window and features thumbnails or text references to other sites that are either similar by nature/content to the current site displayed in the preview window or sponsored links. Stumble allows the user to change the content in the current preview window, replacing it with one of similar content. Full-screen initiates a full-screen mode to enhance the consumption of information displayed in the current preview page.

The preview window of the present invention can also display "select" information from the underlying content of the target link. That is, the present invention permits configuring the preview window (or the processes which determine the content to be displayed therein) to intelligently parse out unnecessary or undesired information in the target page to present the user with a focused view of the important or desired information. For example, the preview window may return just an image in search results from an image-based search engine (e.g., images.google.com).

In part, the problem of extracting information from Internet content is made easier by using options to either selectively, or as a whole, save the content of the preview window or current page to a local hard drive, designated storage unit, or a server on the Internet, etc. Such functionality may be provided as a cursor control operation (e.g., a right-click function in traditional windows/tabs) and/or as a toolbar item (e.g., within the preview window).

In part, the problem of sharing information is made easier by using options to either selectively, or as a whole, share some or all of the content of the preview window or current page without using the traditional email clients. The user can share links without losing context and/or focus using the Share function by registering a valid email address. The Share function can also import and save addresses from existing email clients/hosts. Such functionality may be provided as a cursor control operation (e.g., a right-click function in traditional windows/tabs) and/or as a toolbar item (e.g., within the preview window).

Another function allows for publishing either the URL (or other locator) or a thumbnail or even the actual Web page being previewed to a server (such as Flickr, Delicious, etc). Moreover, the preview may be converted to an electronic "postcard". For example the content displayed in the preview window may be converted to an image (if it is not already in that form) and stored as such. A text field may be attached or included with the image object to form a "postcard" (in some cases this may be a separate file from the image). Such a postcard may contain music elements (e.g., attached by the user or from another site such as Sellaband.com). The postcard may also contain a image in the form of a "stamp", allowing for use of "sponsored stamps" as a way to monetize the images associated therewith (e.g., via a revenue sharing arrangement). The user may share or other wise transmit the postcards with/to others.

A further function may allow for the accumulation of previews/information as a "stack" (e.g., associated with a toolbar). In part, the problem of sharing a chain of information (e.g., links, files, images, videos, etc.) is solved using such a stack feature of the present invention. Using the stack, the user can mark content within a page or preview window to add it to a dynamically created custom stack (an accumulation of a series of links). This functionality is further discussed below.

In part, the problem of access to references is solved using a cursor control (e.g., a right-click) search mechanism. In accordance with the present invention, a user can simply select a word or a phrase that appears on a Web page displayed within a browser interface and then submit that word/phrase as a query to any site (e.g., including but not restricted to search engines such as Google, on-line dictionaries such as FreeDictionary, on-line encyclopedias such as Wikipedia, and image search engines such as Google Images). The results are then displayed using the preview window while keeping the user in the context (view) of the current/original page.

As will be more fully described below, the quick view or preview may be an image of a target web page superimposed over the search result page in response to the mouseover event. The target web page itself may be prefetched as or after the search result page has been loaded by the browser, or may be fetched at or about the time of the mouseover event and saved in the browser cache. Rather than displaying the target web page in a separate window, however, it is an image of the target web page that is displayed to the searcher.

In some cases, rather than retrieving the target web page itself, it may prove convenient to retrieve a cached version of that web page as stored by the search engine provider. For example, where the time required to download the target web page proves to be excessive, the cached version of the page may instead be retrieved and used for purposes of the quick view. Alternatively, or in addition, it may be convenient in some cases to store quick view images of web pages on servers associated with the search engine provider and display those images as quick views in response to mouseover or other desired events.

Figure 2:
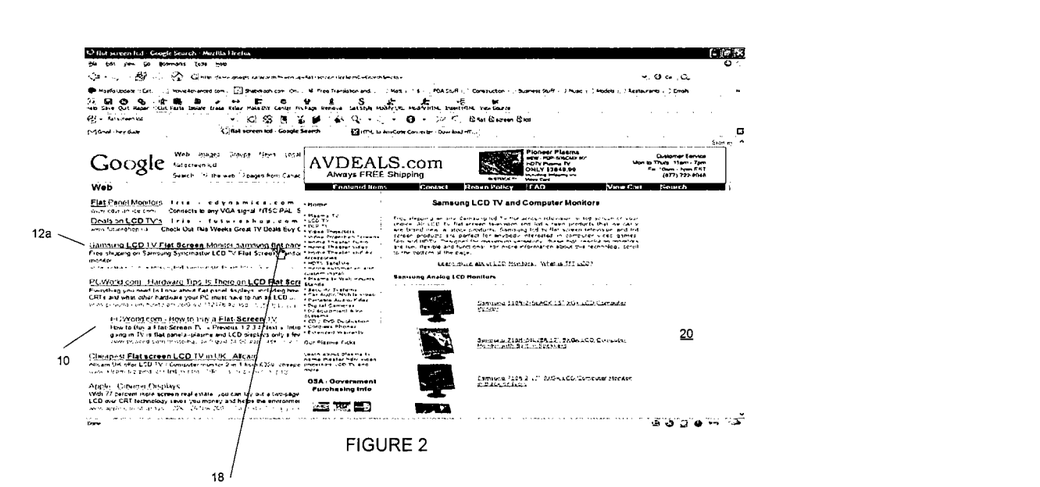
FIG. 2 illustrates a preview window configured in accordance with an embodiment of the present invention and displaying a preview of a Web site linked to by a hyperlink in a search result page.

FIG. 2 illustrates this concept of a quick view in greater detail. In this illustration the same search result page 10 as shown in FIG. 1 is being displayed in a browser window. The searcher has now positioned his/her cursor 18 near the hyperlink associated with the first, non-sponsored link result 12a. In response, a quick view 20 of the associated web site has been displayed superimposed over the search result page 10. Previewed links may change color to indicate those already viewed and/or the one currently being viewed.

The quick view 20 of the target web page (or, in other cases, information elements such as images, video files, audio files, text, etc) associated with the "Samsung LCD TV Flat Screen Monitor" hyperlink 12a which was returned in response to the "flat screen lcd" search query is an image of the actual web page, which itself may have been prefetched before the link was "mouseover" by the searcher or, preferably, as the user positioned his/her cursor 18 over or near that link. In one embodiment of the present invention, the mouseover action causes an event handler for creating the quick view to be called. The event handler is identified by script added to the search engine result page at the time the page is loaded by the browser.

That is, as the search engine result page is being loaded, anchors associated with hyperlinks to target web pages are identified and mouseover event handler scripts are attached to each such anchor. An example of such an event handler may be a script that causes a hidden frame to be rendered in the search result web page. Such a hidden frame may be created through an application programming interface associated with the <canvas>, <iframe>, or other DOM element supported by some browsers. Alternatively, for those browsers which do not support such elements, a custom extension to support the creation of such a hidden frame may be required.

Within this hidden frame, the browser makes an HTTP (or other appropriate) request to the target web page identified by the hyperlink of interest (e.g., the one associated with the subject event handler action) and the page loads in the frame in the conventional fashion. Because the frame is hidden, however, this target web page will not be displayed to the searcher. Conceptually, this can be envisioned as if an unseen actor behind the "screen" of the search result page currently displayed to the user has "seen" the user position his/her cursor near a link on the search result page and, in response, the unseen actor has retrieved the associated web page but has kept is hidden behind the current search result page. The target web page may be loaded into the browser's cache.

Now, rather than display the newly retrieved target web page in a separate window, the <canvas> attribute is used to render the hidden frame containing the web page into a bit mapped image. A detailed tutorial describing the <canvas> attribute and its use may be found at http://developer.mozilla.org/en/docs/Canvas_tutorial. For purposes of the present invention, the use of the <canvas> attribute is not critical and, as indicated above, custom scripts may be provided to accomplish the end result of creating a scalable image of the target web page. In some cases, for example where the target web page does not load in the hidden frame within a designated timeout period, the browser may be instructed to retrieve a cached version of the target web page as maintained by the search engine provider or other site. This previously cached page is loaded in the hidden frame and an image thereof created.

The image of the target web site (or the cached variant thereof) is now inserted as a layer onto the displayed search result page. If the browser supports the opacity attribute, then the display may be effected as a "fade-in". In other cases, the display may be effected using other visual effects. Further, the image may be successively scaled as it is revealed to the searcher so that it can appear to grow from small size to larger size (such as that illustrated in FIG. 2). The use of the scaling and/or other visual effects or rendering techniques is not critical to the present invention. Similarly on a mouseout event, the event handler may modify the scaling and/or opacity attributes of the image of the target web page so as to have the image shrink and/or fade-out from the user's view.

Figure 3:
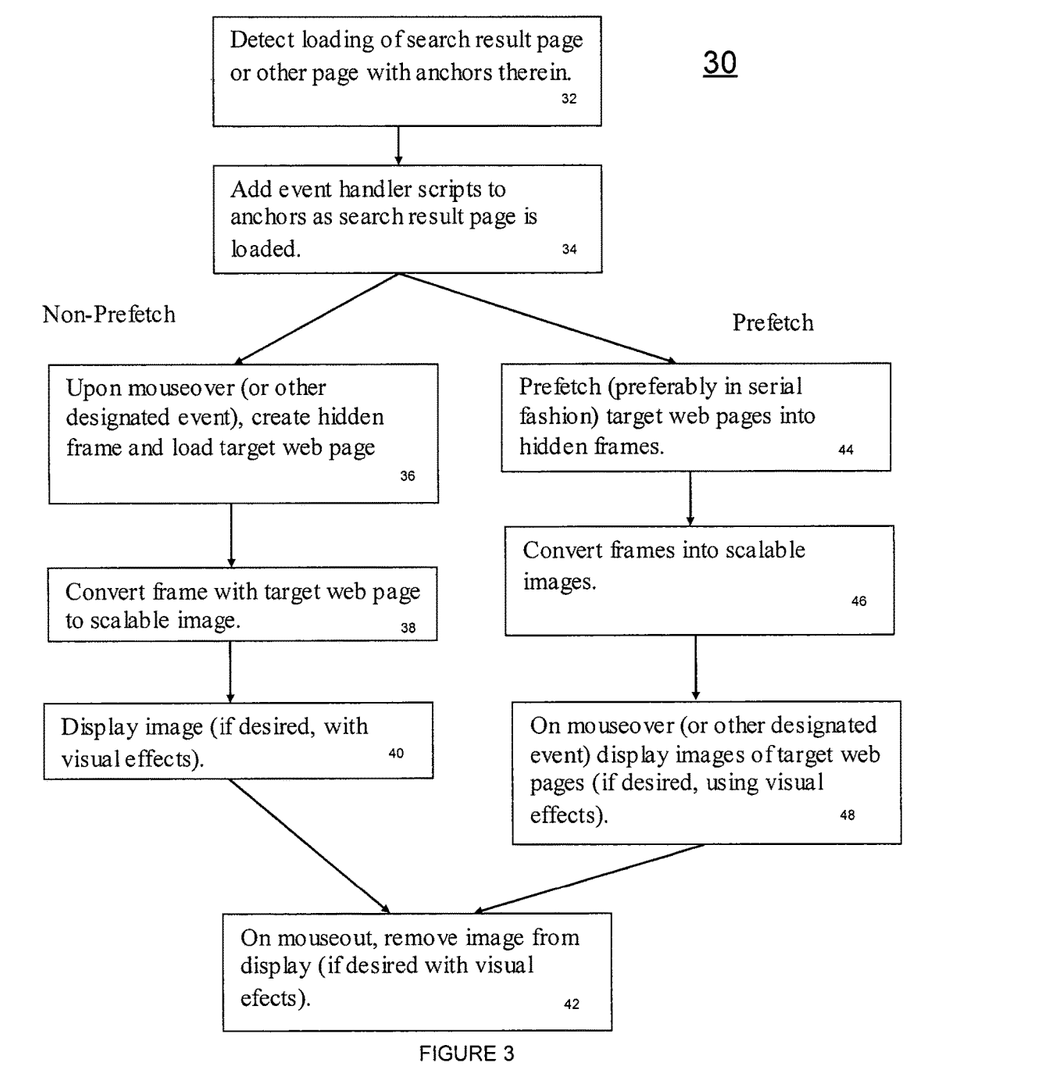
FIG. 3 illustrates a process for providing a preview of a Web site in accordance with embodiments of the present invention.

Referring then to FIG. 3, the basic procedure 30 involved in creating preview is one of capturing the content of a target web page (e.g., a page pointed to by a hyperlink on a currently rendered page in a browser) into a hidden frame. Converting the hidden frame to an image (and in doing so potentially clipping only a portion of the entire web page within the hidden frame). Displaying the image of the target web page to the user (potentially making use of scaling, fading and/or other visual effects). The target web page and/or the image thereof may be stored (temporarily at least) in the browser's cache.

In detail, procedure 30 begins with step 32 in which the loading of a search result or other Web page with anchors therein is detected. Then, at step 34, event handler scripts are added to the anchors as the page is loaded in the browser. Next, at step 36, upon a mouseover, or other designated event, a hidden frame is created and the target Web page is loaded. Then at step 38, the frame with the target Web page loaded therein is converted to a scaleable image. That image is displayed (e.g., with a variety of visual effects as discussed above) at step 40. Finally, at step 42, the image may be removed from view on a mouseout or other designated event (e.g., again using one or more visual effects).

Note that an alternative process is also shown in which target web pages are prefetched prior to a mouseover or other event. In such cases it is preferable (though not strictly necessary) to prefetch pages in serial fashion (e.g., in the order in which they appear is a search result page, in relation to their proximity to the cursor's present position on the screen, etc.) so as not to cause excessive demand for bandwidth. In this way the images can be ready for display upon mouseover, without having to wait for the target web page to be loaded in the hidden frame. In some cases it may be desirable to indicate the availability of a quick view image of a target web page by highlighting the associated hyperlink, displaying an icon near said hyperlink, or otherwise.

In this alternative process, following step 34 when event handler scripts are added to the anchors in the page, step 44 of prefetching the target Web pages into hidden frames is performed. Next, step 46 of converting these frames into images is performed. Finally, the images are displayed on a mouseover or other event associated with the associated link (step 48). As before, on mouseout or other event, the images may be removed from view (step 42).

In either case, the web page (or other information) is displayed in response to a mouseover or other event without the searcher having to affirmatively select a hyperlink to click through to a target web site. By immediately displaying the quick view of the target web site in this manner, the searcher can make a much better informed decision as to the relevancy of the search result. Decisions about whether or not to click through to the actual web site associated with the search result hyperlink can now be based on more than a few key words in context. As a result, searchers can find relevant information much more quickly.

In the context of sponsored links (see e.g., FIG. 4), allowing for the quick view of web site or other information associated with those sponsored links provides many advantages. For example, searchers can now immediately determine the relevancy of the sponsored link simply by mousing over such links and viewing the image of the target web page in relation thereto. From the search engine provider's point of view an new revenue model—one based on "cash per view" (CPV) is available. Advertisers can be charged for quick views by searchers instead of mere impressions (quick views can be trackable on the basis of downloads to hidden frames or otherwise). Presumably, a quick view provides a richer view of the advertiser's featured goods and/or services and so a more significant fee can be charged than for a mere impression of a sponsored link. At the same time, the search engine provider does not lose valuable search engine result page real estate because all that is displayed in the first instance is the same sponsored link.

Figure 4:
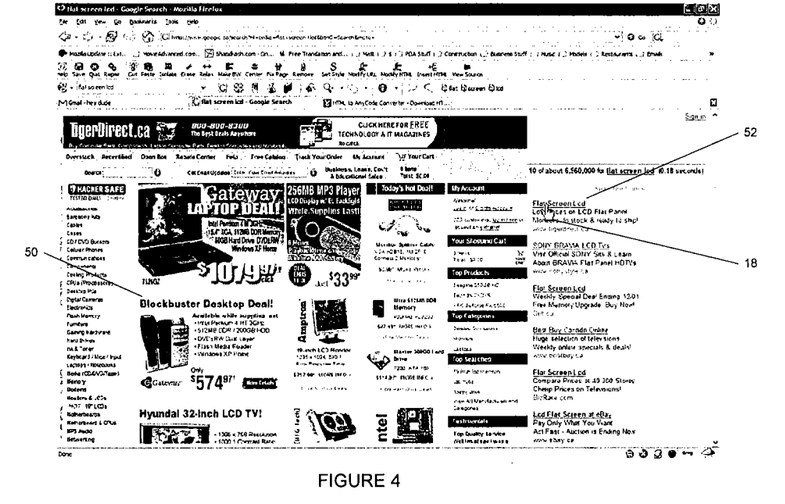
FIG. 4 illustrates an example of a preview window configured in accordance with an embodiment of the present invention and displaying content associated with a sponsored link of a search result Web page.

FIG. 4 shows a preview page 50 being displayed when the user positions cursor 18 over sponsored link 52. Preview page 50 may be generated and displayed in accordance with any or the processes described above. From the advertiser's point of view, a CPV model provides better use of advertising dollars inasmuch as actual page views that lead to click throughs are more likely to generate actual sales. After all, the searcher has a much better idea of what is being offered than was the case for viewing the sponsored link alone and so one would expect that any subsequent click through would indicate true desire to purchase on the part of the searcher.

Quick views of sponsored links can be tracked in several ways (e.g., in order to capture billing information). In one case, a separate server may be imposed between the user and the target web site so as to allow for tracking of quick view requests and later reporting thereof to an ad server or other mechanism. In other embodiments, at or about the same time as a quick view request is made for a sponsored link, a notification of that request may be dispatched to the associated ad view server to allow for tracking of the request. In still further embodiments, quick views for sponsored links could be retired from specially configured web servers that can tract the requests.

There are several means for implementing the methods and systems of the present invention. In one such implementation a browser plug in is provided to the user's Internet browser (e.g., in the form of a tool bar or perhaps with no visual indication). The plug-in provides the functionality to add the event handler scripts to the hyperlinks on the search result or other pages, to generate hidden frames and make requests (e.g., HTTP requests) for the target web sites identified by the hyperlinks returned in response to a search query with the search results page and convert the returned web pages to images, and to display the images as discussed above.

The present invention may also serve a prophylactic purpose in that by allowing searchers to display results through mouseover events such as those described above, users are less likely to be lured to malicious sites where spyware or other malware may be inadvertently downloaded.

Of course, all of the above features may be provided not only for Internet search results but also for local search results, e.g., using desktop search tools and the like. Thus, users may be better able to determine which files or other objects are relevant to their searches. In addition to web pages, audio files, video files or other content may be cached and presented in the manner described above.

In addition to static web pages, the present invention may be used to provide quick views of flash movies associated with web pages or other dynamically loadable content. So long as the browser in which a web page is to be rendered is capable of rendering the target objects (and in some cases this may require the use of one or more plug-ins, for example plug-ins or other applications (e.g., players) to handle .pdf or other documents, audio and/or video files, images, etc., then the quick view procedures described above may be used. Because the quick view relies on the use of a hidden frame within the browser, all of the functionality available to the browser is available to the quick view process.

In some cases the returned web pages may be too large to conveniently display as quick views superimposed over the search result of other page. Therefore, the target web page may be clipped prior to conversion to an image. Indeed, multiple such clippings may be made of different segments of a target web page such that an illusion of scrolling may be achieved when a user mouses over a portion of the quick view image. For example, if the user mouses over a lower portion of the quick view image, that image may be replaced by an image associated with a successive portion of the target web page so as to give the appearance of scrolling down on the actual web page. Alternatively, a target web page may be converted to an image that is subsequently decimated or otherwise compressed so as to be rendered conveniently as an overlay of the search result page.

Other search enhancement features associated with embodiments of the present invention include toolbar buttons to allow a searcher to suppress unwanted search results from reappearing in response to new search queries. For example, often a searcher will modify a search query in an effort to refine the search results returned. If a search result returned in response to a previous query has been designated as not being of interest, this designation can be cached in the browser cache and when a new query is executed any marked results that are not of interest can be omitted from the search result page as displayed to the searcher. Such caching of these decisions and the deletion of search results may be made at the browser level or the server level depending on the implementation.

Additional tool bar features can include the ability to save search results to the user's personal computer in a user-friendly fashion. Presently, when a searcher saves a search result page, the page information is saved as a number of different objects collected in a common folder and referenced by a locally stored html page. This is an inconvenient format and the present invention permits the results to be saved to a hyperlink list indexed by time or other factor. This convenient grouping of search queries and results can be very useful for a user. Search events can be given descriptive labels and the search results may be coded to indicate which links were affirmatively selected, which links were mouse-dover for quick views and which links were ignored.

The search results may be viewable in a dynamically rendered web page (e.g., for which quick views may be generated). Further, search results may be grouped chronologically or by other convenient metric. This allows users to search across past search results. Unlike previous versions of similar tools, these results are saved to a user's personal computer instead of to a search engine provider's server accessible through a personalized account or other means.

Figure 5:
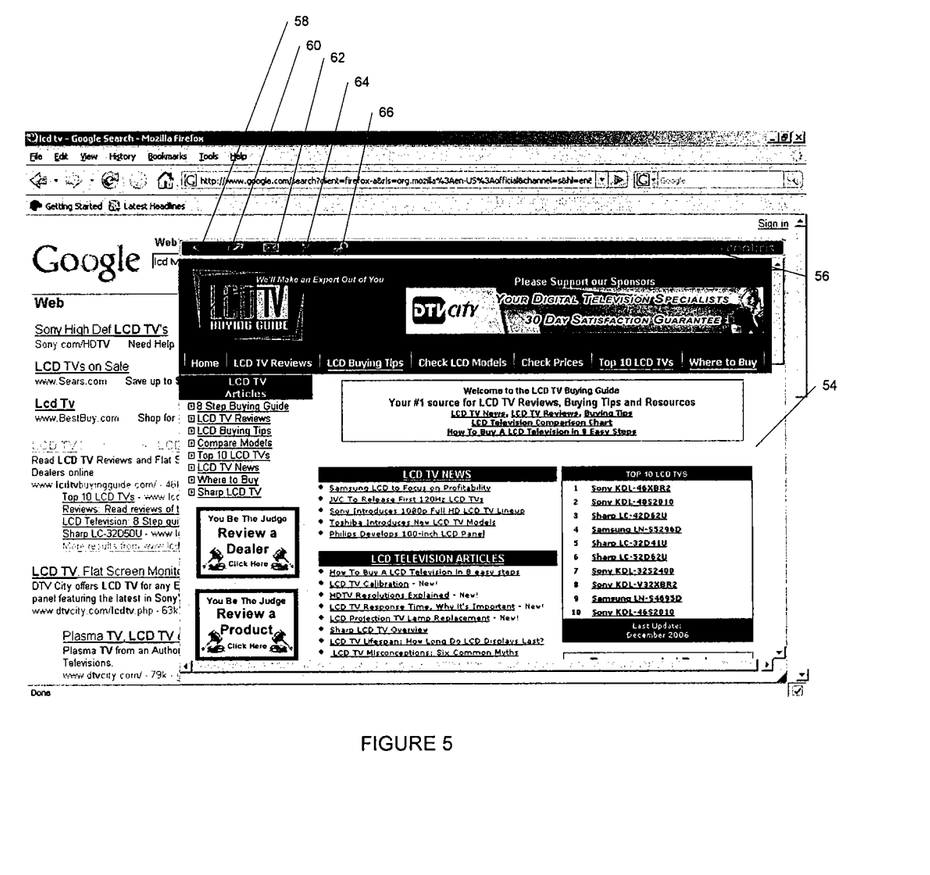
FIG. 5 illustrates a preview window having a toolbar configured in accordance with embodiments of the present invention to permit manipulation of content displayed in the preview window.

Turning now to FIG. 5, a preview window 54 displayed in response to a mouseover or other event is illustrated super positioned over a search result page which includes several links (e.g., returned in response to a search query). This preview window 54 includes a toolbar 56. Toolbar 56 includes a number of icons 58-66, each of which is associated with functionality described above. Moreover, in this instance the preview window is a fully functioning web page, not merely an image of such a page. Hence, all of the links are active and a user can navigate within the preview window 54 just as he/she would in a regular window displayed in a browser.

Icon 58 is an arrow associated with the Back function discussed above. Back allows a user to trace his/her click history within a current preview session. That is, because full navigation is now permitted within preview window 54, a user may advance to further web pages by selecting links in a currently displayed page in the preview window. To return to the original (or immediately preceding page) in the preview window, the Back arrow 58 may be used. Similar functionality has been provided in browsers in the past and so need not be discussed further herein.

Full-screen icon 60 initiates a full-screen mode to enhance the consumption of information displayed in the current preview window 54, selecting full screen icon 60 will open a new browser window or tab and direct the browser to the Web address associated with the page currently displayed in preview window 54. in some cases the content of the preview window may be more easily consumed in the full screen mode.

Figure 7:
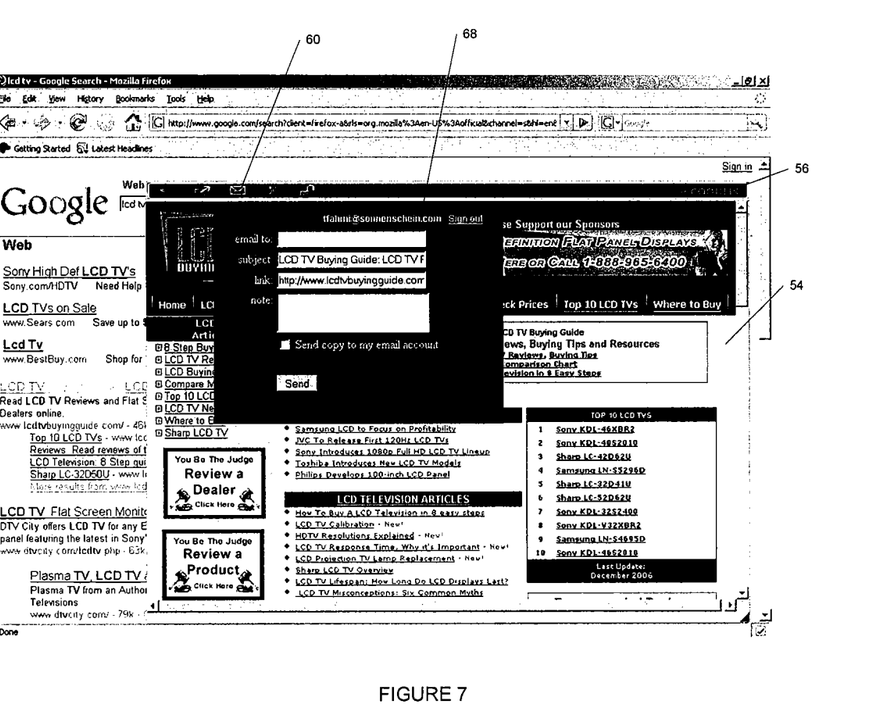
FIG. 7 illustrates an example of a communication interface accessed through the toolbar shown in FIG. 5.

Share icon 62 initiates a communication interface (e.g., a message box) through which users can share contextual information with themselves or others (e.g., by providing one or more email addresses). For example, as shown in FIG. 7, selecting share icon 62 may open an interface 68 through which a user can share (e.g., via email or other means) the web page currently displayed in preview window 54 with others. In some cases the user may be required to verify his/her identity before gaining access to the communication interface.

Close icon 64 may be used to close the preview window 54. When engaged, lock icon 66 ensures that the preview window does not close accidentally (Lock may operate as a toggle and so have On/Off modes).

Figure 8:
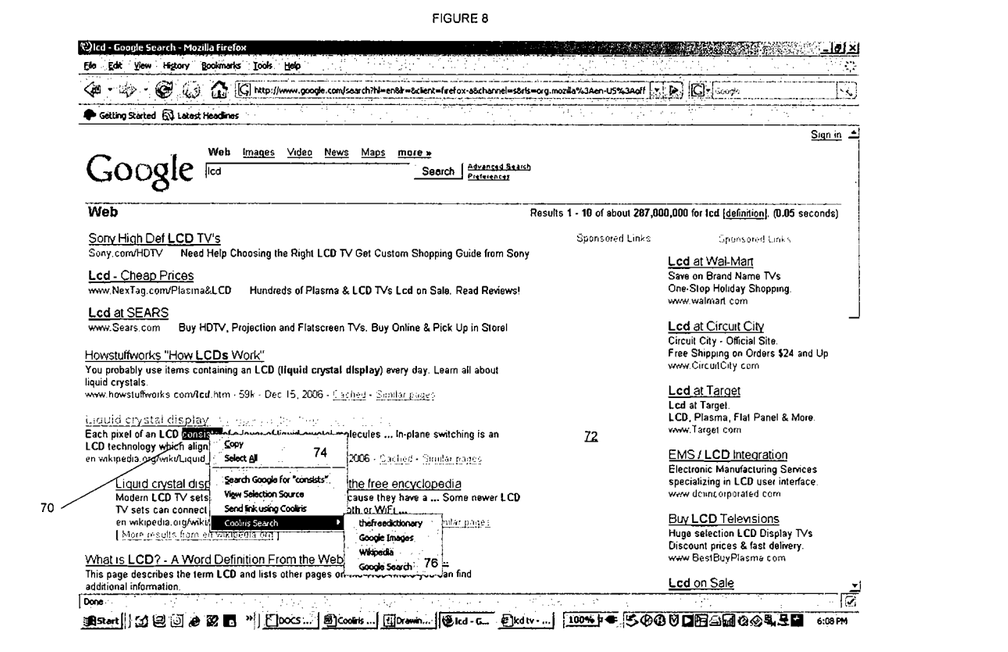
FIG. 8 illustrates an example of a cursor control menu having arranged therein commands for submitting selected content of a Web page as a reference to a designated Web site.
Figure 9:
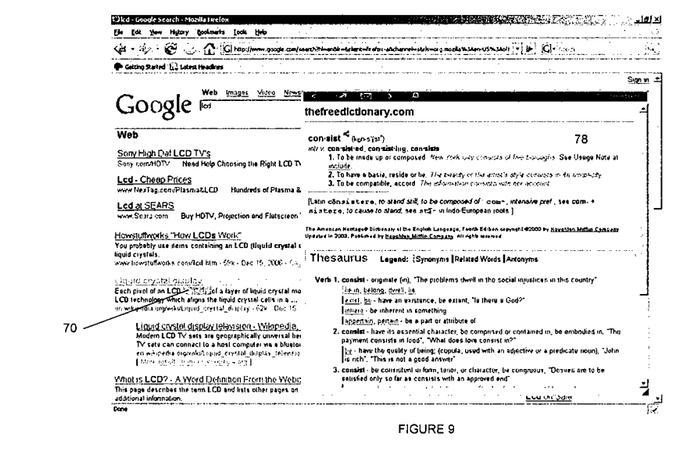
FIG. 9 illustrates an example of results returned from such designated Web site in a preview window.

The present invention also enhances access to references using a cursor control (e.g., a right-click) search mechanism. Referring to FIG. 8, a user may select (e.g., highlight) a word or a phrase 70 that appears on a Web page 72 displayed within a browser interface. Then, in response to a cursor control operation (e.g., a right click) a menu 74 opens. One of the options in menu 74 is a search submenu 76, which allows the user to submit the highlighted word/phrase as a query to any site (e.g., including but not restricted to search engines such as Google, on-line dictionaries such as FreeDictionary, on-line encyclopedias such as Wikipedia, and image search engines such as Google Images). The results are then displayed using the preview window while keeping the user in the context (view) of the current/original page (see, e.g., FIG. 9 where the definition of the highlighted term "consist" is displayed in preview window 78). Similarly, extracting information from Internet content is made easier by the present invention through the use of cursor control menu options to either selectively, or as a whole, save the content of a preview window or current Web page to a local hard drive or other designated storage site.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description presented above are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Figure 6:
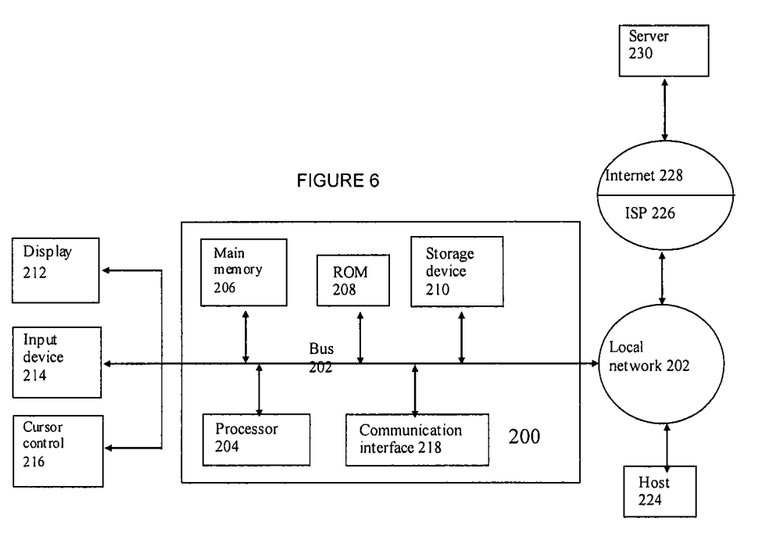
FIG. 6 illustrates a computer system in which embodiments of the present invention may be embodied and or operate.

FIG. 6 is a block diagram illustrating an exemplary computer system 200 upon which an embodiment of the invention may be implemented. The present invention is usable with currently available personal computers, mini-mainframes and the like.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Computer system 200 may be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of a computer system 200, such as the illustrated system, to generate a logical data model and a physical data model of a data base, maintain correspondence between the logical data model and physical data model, and create a data warehouse using a physical database design and data description language created from the physical data model. According to one embodiment of the invention, the logical data model, physical data model, data warehouse and display is provided by computer system 200 in response to processor 204 executing sequences of instructions contained in main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, a DVD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 200 also includes a communication interface 218 coupled to the bus 202. Communication interface 208 provides a two-way data communication as is known. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. In the preferred embodiment communication interface 218 is coupled to a virtual blackboard. Wireless links may also be implemented. In any such implementation, communication interface 218 sends and receives electrical, electromagnetic or optical signals which carry digital data streams representing various types of information. For example, two or more computer systems 200 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for information discovery and visualization as described herein. The received code may be executed by processor 204 as it is received, and/or stored in storage device 210, or other non-volatile storage for later execution.

The present invention is also applicable to RSS feeds and readers therefore. Because RSS is generally presented in an XML format it can be rendered in a fashion similar to the HTML information associated with a web site. Quick view for RSS content is an improvement over the static readers presently offered.

Thus, methods and systems relating to the display of information returned from a search engine, such as an Internet or personal computer desktop search engine, etc., and more particularly, to the display of such information without the need for the user to affirmatively select a hyperlink associated with a search engine query result or open a new window have been described. Various alternatives to the embodiments discussed above should be deemed to be within the scope of the present invention. For example, the preview window may be superimposed over or displayed adjacent to the primary (or parent) web page displayed in the browser. Moreover, the image or navigable web page displayed in the preview window may be fetched either prior to or concurrently with the display thereof in the preview window.

In some embodiments of the invention, the preview window may be used to display an interactive web page rather than just an image thereof. In such cases, the user may interact directly with the interactive page, for example by navigating to other pages by clicking links or performing actions within the page initially displayed. Further, the content of the page displayed in the preview window may be altered from its original. For example, when previewing a news article on a news Web site, the table of contents could be removed to optimize screen area usage. Alternatively, or in addition, highlighting, summarizing, compressing, or other techniques may be used to indicate regions of the page that are relevant to the user's browsing context. For example, search terms may be highlighted in the previewed page. Additionally or alternatively, regions of the previewed page deemed most relevant to the user's browsing context may be extracted and concatenated together to form a compressed representation.

In some embodiments of the invention, the previewed page may be presented via "progressive disclosure" of content, wherein only a portion of the entire page content is initially presented. Later, in response to user activity, such as a cursor control event, additional content on the previewed page may be retrieved and/or revealed. For example, clicking a button placed next to a search result description may expand the summary associated with the search result (e.g., in place on the web page) to reveal more of the page content. Alternatively, or in addition, selecting a word in an article may open a preview window displaying information related to that word. Also, a mouseover event may initiate a display of images related to the moused-over region of the page. Such images may be displayed in a preview window or other element.

Embodiments of the invention may incorporate methods for facilitating relevancy feedback and thereby refining the results of a search query. For example, a user may highlight or otherwise indicate interest in a particular region of a parent or preview page, and that information conveyed to a search engine. Such feedback allows for refining a search according to relevant results, as selected by the user. Additionally or alternatively, the user's behavior (e.g., mouse movements, clicks, scrolling, and other user input data) may be observed and analyzed with respect to the browsing interface, and the observations/analysis used infer interest and/or lack of interest in certain regions of a page. Such information may be used to provide a modified set of results to the user.

What is claimed is:

1. A computer-implemented method for displaying an RSS feed, wherein a first Web page is being displayed in a browser, comprising:

in response to a cursor control event associated with the first Web page, displaying in a preview window a preview of a second Web page linked to by the first Web page, wherein the second Web page is associated with an RSS feed; and in response to a cursor control event associated with the second Web page, displaying the RSS feed in an area adjacent to the preview window.

2. The method of claim 1, wherein displaying the RSS feed comprises displaying the RSS feed in a drawer that slides out from the preview window.

3. A computer-implemented method for displaying search results, wherein a Web page is being displayed in a browser, and wherein the displayed Web page is part of a first Web site, comprising:

receiving user input selecting a text portion of the displayed Web page, wherein the selected text portion comprises neither a Uniform Resource Locator (URL) nor a hypertext link;

in response to a cursor control event, displaying a menu that lists a plurality of Web sites, wherein each Web site in the plurality differs from the first Web site;

receiving user input selecting a Web site from the plurality of Web sites;

submitting the selected text portion to the selected Web site as a search query;

receiving search results from the selected Web site; and displaying the search results in a preview window.

4. The method of claim 3, wherein the cursor control event comprises a right-click.

5. The method of claim 3, wherein the selected Web site comprises an on-line dictionary or an on-line encyclopedia.

6. The method of claim 3, wherein the selected Web site comprises a search engine.

7. The method of claim 3, wherein the preview window is superimposed over the Web page displayed in the browser.

* * * * *